United States Patent [19]
Moebius et al.

[11] Patent Number: 5,934,740
[45] Date of Patent: Aug. 10, 1999

[54] AIR GUIDING DEVICE

[75] Inventors: Wolfgang Moebius, Schwieberdingen; Matthias Kulla, Leonberg, both of Germany

[73] Assignee: Dr. Ing. h.c.F. Porsche AG, Weissach, Germany

[21] Appl. No.: 09/102,045

[22] Filed: Jun. 22, 1998

[30] Foreign Application Priority Data

Jun. 20, 1997 [DE] Germany .......................... 197 27 685

[51] Int. Cl.$^6$ .................................................. B62D 35/00
[52] U.S. Cl. ...................................... 296/180.1; D12/181
[58] Field of Search ........................ 296/180.1; D12/181

[56] References Cited

U.S. PATENT DOCUMENTS

| 4,318,565 | 3/1982 | Lay ........................................ 296/180.1 |
| 4,533,168 | 8/1985 | Janssen et al. ........................ 296/180.1 |
| 5,678,884 | 10/1997 | Murkett et al. ...................... 296/180.1 |

FOREIGN PATENT DOCUMENTS

| 31 32 369 | 3/1983 | Germany . |
| 35 38 253 | 4/1987 | Germany . |
| 44 41 592 | 5/1996 | Germany . |
| 2 142 287 | 1/1985 | United Kingdom . |

*Primary Examiner*—Gary C. Hoge
*Attorney, Agent, or Firm*—Evenson, McKeown, Edwards & Lenahan, P.L.L.C.

[57] ABSTRACT

An air guiding device for improving the road grip of a vehicle has a wing against which the air stream flows. The wing extends approximately in the transverse direction, generating a negative lift and being supported on the vehicle. The wing comprises an upper and a lower wing element which extend transversely to the vehicle, are arranged at a distance from one another and are connected with one another by end cheeks which are arranged on the end side and have an approximately U-shaped cross-section. The two wing elements and the end cheeks form a bounded gap through which air flows.

15 Claims, 2 Drawing Sheets

AIR GUIDING DEVICE

BACKGROUND AND SUMMARY OF THE INVENTION

This application claims the priority of German application 197 27 685.7, filed in Germany on Jun. 20, 1997, the disclosure of which is expressly incorporated by reference herein.

The invention relates to an air guiding device.

From German Patent Document DE 44 41 592 A1, an air guiding device is known in the case of which an upper wing is arranged between lateral cheeks and a spoiler is arranged at a distance thereto. The side cheeks bound an air gap formed between the wing and the spoiler.

It is an object of the invention to provide an air guiding device which improves road grip of the vehicle due to a negative lift force generated by the air flow resulting in optimal vehicle handling, particularly at high speeds.

This and other objects haven been achieved according to the present invention by providing an air guiding device for improving a road grip of a vehicle, comprising: an upper wing and a lower wing supported on the vehicle extending approximately in a transverse direction of the vehicle, said upper and lower wings being arranged at a distance from each other and being connected at transverse ends with each other via respective end cheeks, said end cheeks having an approximately U-shaped cross-section, said upper and lower wings and said end cheeks defining a gap through which air flows.

The principal advantages achieved by the invention are that, in addition to an improved road grip, optimized aerodynamics are achieved; that is, that the air guiding device still reduces the drag coefficient and the air flow can flow around and through the device without any significant disadvantageous air swirl formations.

For this purpose, the wings of the air guiding device are connected by way of end cheeks defining a beak-shaped opening toward the rear, so that the air can flow through the wings on the exterior side over obliquely disposed surfaces, as well as over interior-side air guiding surfaces on the cheeks without any significant drag.

So that the air flow, coming from the roof over the rear end of the vehicle, can enter between the wings without significant swirls, the leading edge of the upper wing is rounded toward the rear, with respect to the driving direction.

For achieving a negative lift on the exterior surface, the upper wing element has an inwardly directed (i.e., concave) curvature in the longitudinal direction, the interior surface having an outwardly directed (i.e., convex) larger curvature which points to an approximately plane interior wing surface of the lower wing element.

The cross-section of the flow-through opening between the two wing elements has an approximately trapezoidal shape and is designed such that the air flow can be guided from the roof and an area of the lateral surfaces without interruption through the air gap. In the case of the design of the wing elements as well as of the air gap and of the end cheeks, it is important that a compromise is achieved between an optimally operating negative lift and an acceptable drag force.

So that a fast mounting and demounting of the air guiding device can be carried out on the vehicle, it is fixedly connected with the rear lid prior to mounting on the vehicle.

Other objects, advantages and novel features of the present invention will become apparent from the following detailed description of the invention when considered in conjunction with the accompanying drawings.

DETAILED DESCRIPTION OF THE DRAWINGS

Referring to FIGS. 1–4, the air guiding device 1 comprises essentially two mutually spaced wing elements 2, 3 which are connected with one another by way of end-side end cheeks 4, 5. An air gap 6 is defined between the two wing elements 2, 3 and the end cheeks 4, 5.

Figure 2:
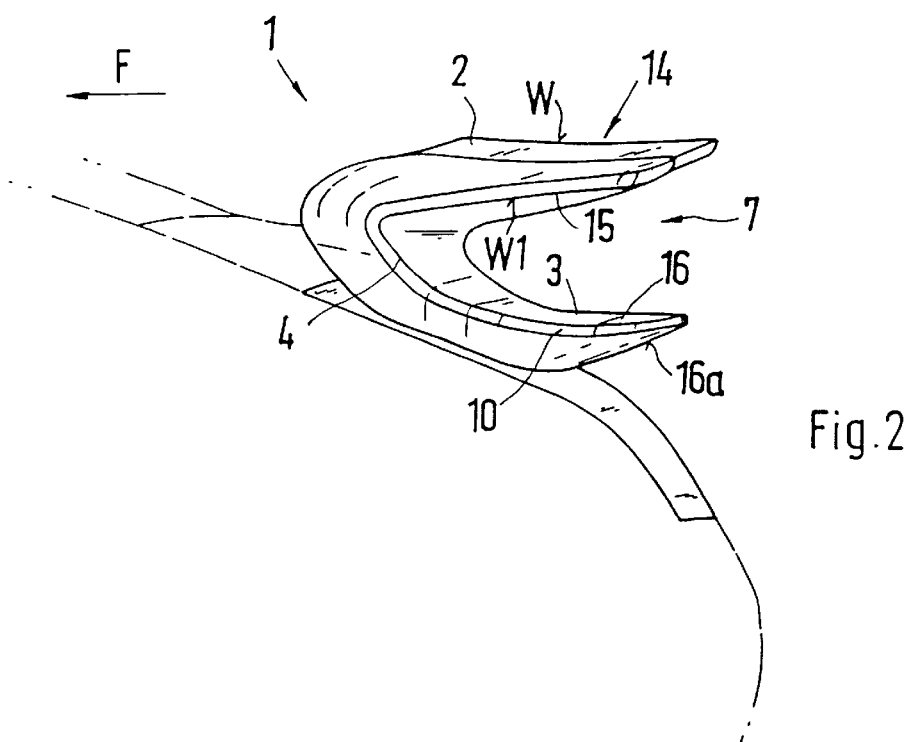
FIG. 2 is a lateral view of the air guiding device of FIG. 1.
Figure 3:
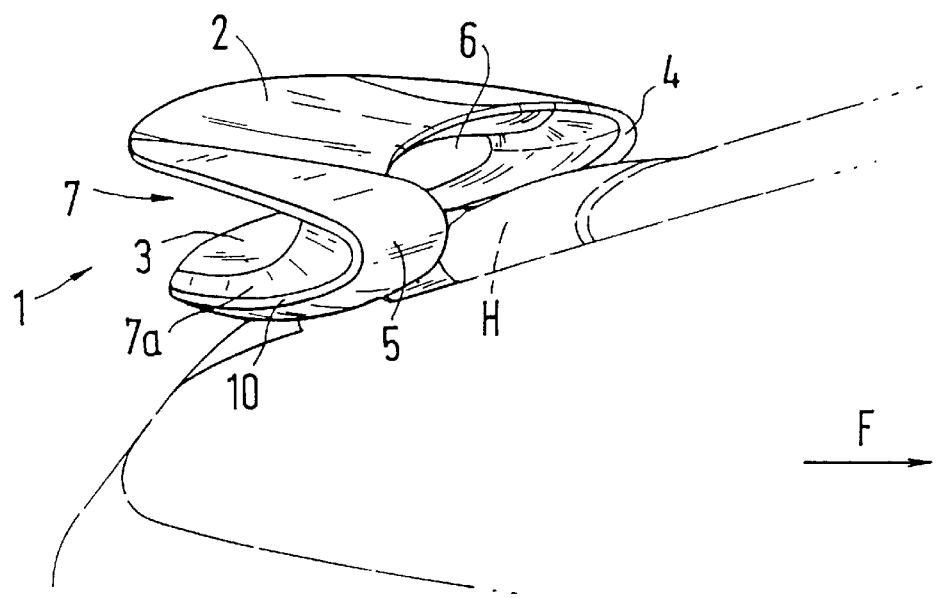
FIG. 3 is a schematic lateral perspective view of the air guiding device.

As aerodynamic molded bodies, the end cheeks 4, 5 have a U-shaped construction and, in a lateral view according to FIG. 3, define a beak-shaped opening 7 toward the rear. The end cheeks 4, 5 have air guiding surfaces 7a leading/transitioning into the upper and lower interior surface 15, 16 of the wing elements 2, 3 (see FIG. 2).

The air guiding surfaces 7a of the end cheeks 4, 5 extend from the interior surfaces 15, 16 of the wing elements 2, 3 toward the exterior side approximately diagonally to the outside in the driving direction F and end in a boundary edge 10.

Figure 4:
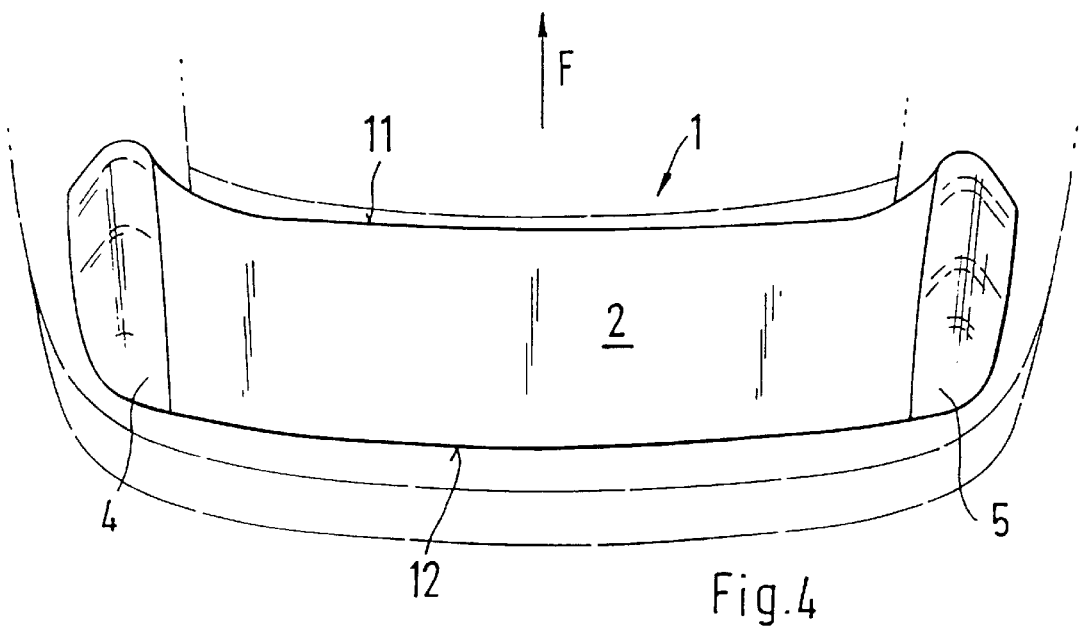
FIG. 4 is a top view of the air guiding device.

The upper wing element 2 has a curved upper front boundary edge 11 which is arranged to extend approximately in parallel to a rearward boundary edge 12 (see FIG. 4). As shown in FIG. 2, the exterior surface 14 of the wing element 2 has an inwardly directed (i.e., concave) curvature W. In contrast, the interior surface 15, as shown in FIG. 2, is constructed with a larger, outwardly directed (i.e., convex) curvature W1.

The interior surface 16 of the lower wing element 3, which has an approximately plane surface parallel to driving direction F in the area of the longitudinal axis of the vehicle, faces the curvature W1 of the upper wing element 2.

Figure 1:
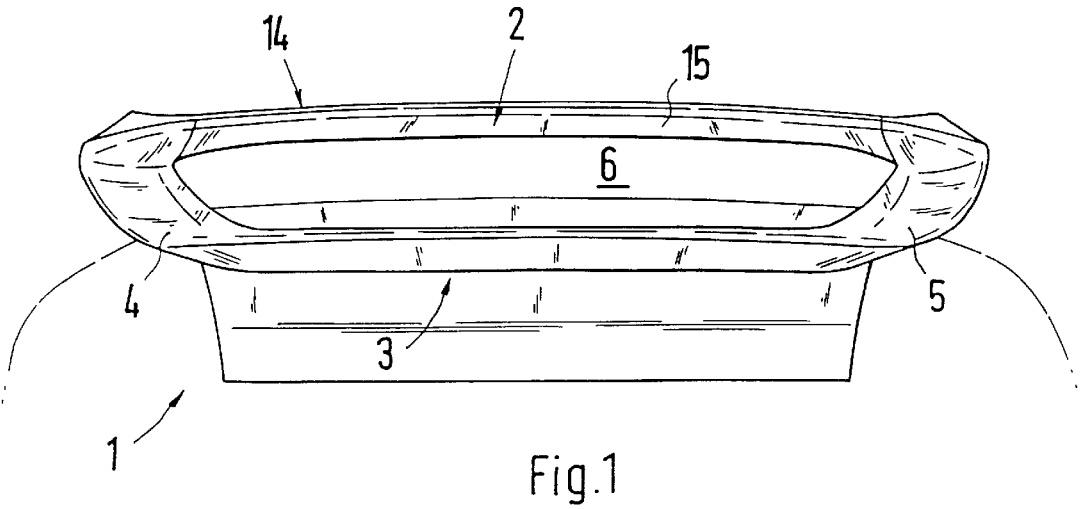
FIG. 1 is a rear view of the air guiding device viewed in the driving direction F according to a preferred embodiment of the present invention.

As illustrated in detail in FIG. 1, the wing elements 2, 3 and the lateral end cheeks 4, 5 are designed such that an approximately trapezoidal air gap 6 is defined in the transverse direction of the vehicle, as viewed from the rear in FIG. 1.

The exterior surface 16a of the lower wing element 3, together with the interior surface 16 and the rear lid H, forms an approximate triangular cross-sectional shape, as illustrated in detail in FIG. 2. This triangular shape exists particularly in the longitudinal center of the vehicle.

The air guiding device 1, essentially consisting of the two wing elements 2, 3 and the end cheeks 4, 5, is firmly connected with the rear lid H as an assembly unit; that is, that the air guiding device is fixed on the rear lid H before being mounted on the motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air guiding device for improving a road grip of a vehicle, comprising:

an upper wing and a lower wing extending approximately in a transverse direction of the vehicle, said upper and lower wings being arranged at a distance from each other and being connected at transverse ends with each other via respective end cheeks, said end cheeks having an approximately U-shaped cross-section, said upper and lower wings and said end cheeks defining a gap through which air flows, said lower wing being supported on a vehicle body panel, said end cheeks projecting upwardly and transversely outwardly from said lower wing and away from said vehicle body panel, said end cheeks including air-guiding surfaces which lead into upper and lower interior surfaces of the wings.

2. A device according to claim 1, wherein said end cheeks define a beak-shaped opening facing the rear of the vehicle when viewed in said transverse direction.

3. A device according to claim 2, wherein said beak-shaped opening is defined by said air guiding surfaces of said end cheeks.

4. A device according to claim 3, wherein said air guiding surfaces of the end cheeks extend from the interior surfaces of the wings toward the exterior side approximately diagonally to the outside in a driving direction, and the air guiding surfaces each end at an exterior boundary edge of the end cheeks.

5. A device according to claim 1, wherein the upper wing has a curved forward boundary edge which extends approximately parallel to a rearward boundary edge of the upper wing.

6. A device according to claim 1, wherein the upper wing has an exterior surface facing generally upward with an inwardly directed curvature, and an interior surface facing generally downward with an outwardly directed curvature, said interior surface facing an approximately plane interior surface of the lower wing.

7. A device according to claim 6, wherein a curvature of said interior surface of the upper wing is larger than a curvature of the exterior surface of the upper wing.

8. A device according to claim 1, wherein the wings and cheeks are mounted on a rear lid or body panel of the vehicle.

9. A device according to claim 8, wherein the lower wing has an exterior surface facing generally downward, and an interior surface facing generally upward, and a cross-section of said exterior surface, said interior surface, and said rear lid of panel is approximately triangular.

10. A device according to claim 1, wherein the air gap defined by said wings and said cheeks has an approximately trapezoidal cross-section, viewed from a rear of the vehicle.

11. A device according to claim 8, wherein the wings and cheeks are connected with the rear lid or body panel of the vehicle as a pre-assembly unit prior to mounting the rear lid or body panel on the vehicle.

12. A device according to claim 1, wherein each of said end cheeks has a generally U-shaped transverse outer boundary edge which defines a rearwardly facing opening, each of said end cheeks having a generally U-shaped rearward air-guiding surface extending diagonally inwardly from said U-shaped boundary edge toward the rear, each of said end cheeks having a generally U-shaped forward air-guiding surface extending diagonally outwardly from said U-shaped boundary edge toward the front.

13. An air guiding device for a vehicle, comprising:

a lower wing coupled to a vehicle body panel;

an upper wing arranged above said lower wing;

a pair of end cheeks connecting transverse ends of said lower and upper wings, respectively, each of said end cheeks having a generally U-shaped transverse outer boundary edge which defines a rearwardly facing opening, each of said end cheeks having a generally U-shaped rearward air-guiding surface extending diagonally inwardly from said U-shaped boundary edge toward the rear, each of said end cheeks having a generally U-shaped forward air-guiding surface extending diagonally outwardly from said U-shaped boundary edge toward the front.

14. An air guiding device according to claim 13, wherein said end cheeks project upwardly and transversely outwardly from said lower wing and away from said vehicle body panel.

15. An air guiding device according to claim 13, wherein said rearward air-guiding surface leads into upper and lower interior surfaces of the wings.

* * * * *